United States Patent
Gisler et al.

(10) Patent No.: US 10,233,870 B2
(45) Date of Patent: Mar. 19, 2019

(54) CONTROL DIAPHRAGM FOR DIAPHRAGM CARBURETORS

(71) Applicant: Dätwyler Schweiz AG, Schattdorf (CH)

(72) Inventors: Bruno Gisler, Altdorf (CH); Norbert Haberland, Euskirchen (DE)

(73) Assignee: DÄTWYLER SCHWEIZ AG, Schattdorf (CH)

( * ) Notice: Subject to any disclaimer, the term of this patent is extended or adjusted under 35 U.S.C. 154(b) by 111 days.

(21) Appl. No.: 15/327,679

(22) PCT Filed: Jul. 7, 2015

(86) PCT No.: PCT/EP2015/065483
§ 371 (c)(1),
(2) Date: Jan. 20, 2017

(87) PCT Pub. No.: WO2016/012233
PCT Pub. Date: Jan. 28, 2016

(65) Prior Publication Data
US 2017/0211514 A1     Jul. 27, 2017

(30) Foreign Application Priority Data

Jul. 21, 2014   (CH) .................................. 1096/14
Apr. 14, 2015   (CH) .................................. 516/15

(51) Int. Cl.
*F02M 17/00*   (2006.01)
*B01F 3/04*   (2006.01)
(Continued)

(52) U.S. Cl.
CPC ......... *F02M 17/04* (2013.01); *B01F 3/04021* (2013.01); *F02M 17/40* (2013.01); *F16J 3/02* (2013.01)

(58) Field of Classification Search
CPC ........ B01F 3/04; B01F 3/04021; F02M 17/04
(Continued)

(56) References Cited

U.S. PATENT DOCUMENTS 3,236,505 A * 2/1966 Phillips .................. F02M 17/04
                                                                261/42
4,837,068 A   6/1989 Martin et al.
(Continued)

FOREIGN PATENT DOCUMENTS

DE         136580 C       3/1902
DE         3919299 A1     1/1990
(Continued)

OTHER PUBLICATIONS

International Search Report dated Sep. 15, 2015 for International Patent Application PCT/EP2015/065483 filed Jul. 7, 2015, 3 pages.
(Continued)

*Primary Examiner* — Robert A Hopkins
(74) *Attorney, Agent, or Firm* — Paul D. Bianco; Gary S. Winer; Fleit Gibbons Gutman Bongini & Bianco PL

(57) ABSTRACT

A control diaphragm for controlling a fuel feed in a diaphragm carburetor of an internal combustion engine, includes a central, substantially flat feeling region, a functional region circumferentially extending around the feeling region in a concentric manner, and a peripheral fastening border for fastening the control diaphragm. The control diaphragm closes off a control chamber of the diaphragm carburetor in a sealing manner in the installed state and is operatively connected by the central feeling region to a controlling lever of the diaphragm carburetor arranged in the control chamber, which controlling lever feels the axial deflection of the feeling region in accordance with an operating-related pressure change in the control chamber. The control diaphragm is composed of a temperature- and (Continued)

fuel-resistant, non-elastomeric and uniformly thick plastic film, in which a plurality of concentric corrugations forming the functional region are formed so that axial deflection of the feeling region progresses in dependence on the operating-related pressure change in the control chamber in accordance with a predefined displacement/pressure characteristic curve.

20 Claims, 4 Drawing Sheets

(51) Int. Cl.
  *F02M 17/04* (2006.01)
  *F02M 17/40* (2006.01)
  *F16J 3/02* (2006.01)
(58) Field of Classification Search
  USPC .......................................................... 261/38
  See application file for complete search history.

(56) References Cited

U.S. PATENT DOCUMENTS

| 4,978,478 | A | 12/1990 | Vonderau et al. |
| 6,446,939 | B1 | 9/2002 | Hoppe et al. |
| 7,905,172 | B2 | 3/2011 | Ohrle |
| 2008/0020178 | A1 | 1/2008 | Ohrle |

FOREIGN PATENT DOCUMENTS

| DE | 3827555 A1 | 2/1990 |
| DE | 10142247 A1 | 3/2002 |
| DE | 20 2005 020 877 U1 | 9/2006 |
| EP | 0396755 A1 | 11/1990 |
| EP | 0608490 A1 | 8/1994 |
| EP | 1286040 A2 | 2/2003 |
| EP | 1892414 A1 | 2/2008 |
| WO | 2014/018723 A1 | 1/2014 |

OTHER PUBLICATIONS

Written Opinion for International Patent Application PCT/EP2015/065483 filed Jul. 7, 2015, 5 pages.
Search Report dated Oct. 6, 2014 for Swiss Patent Application No. 1096/2014.
International Preliminary Report on Patentability dated Jan. 24, 017 for PCT/EP2015/065483, filed Jul. 7, 2015.
Written Opinion dated Dec. 2, 2016 for PCT/EP2015/065483, filed Jul. 7, 2015.

\* cited by examiner

CONTROL DIAPHRAGM FOR DIAPHRAGM CARBURETORS

TECHNICAL FIELD

The invention pertains to a control diaphragm for controlling a fuel feed in a diaphragm carburetor of an internal combustion engine.

TECHNICAL BACKGROUND

Diaphragm carburetors are primarily used in handheld devices, e.g. power saws, or in model airplanes, which respectively have to function independently of their position. Known control diaphragms are made of fabric-reinforced rubber (e.g. DE202005020877) and centrally feature a circular, rivet-fastened reinforcing plate in a central sensing region (e.g. EP0608490). An example of such a control diaphragm is illustrated in FIGS. 1-3. The control diaphragm is held in the carburetor housing with a peripheral fastening border 3 and closes a control chamber 5 in a sealing manner. A spring-loaded controlling lever 4 is arranged in the control chamber and presses against the central sensing region 1 of the control diaphragm in the region of the reinforcing plate 6 in order to thereby sense a diaphragm stroke or an axial deflection of the sensing region 1, respectively. The control chamber 5 is connected to a carburetor chamber of the diaphragm carburetor. The side of the control diaphragm facing away from the control chamber is subjected to the atmospheric pressure. During the operation of the carburetor, a vacuum in the range of a few millibar being generated in the carburetor chamber or in the control chamber causes a diaphragm stroke of the central sensing region 1 in the tenth of a millimeter to millimeter range, wherein said diaphragm stroke is sensed by the controlling lever 4 and used for controlling the fuel feed. In order to increase the maximum diaphragm stroke, the control diaphragm features a peripheral corrugation 8 that concentrically extends around the reinforcing plate 6.

The rivet-fastened reinforcing plate, which has a radius of more than 50% of the radius up to the peripheral fastening border 3, reinforces an extensive inner region of the control diaphragm. The reinforcing plate causes a uniform diaphragm stroke over the region covered by the reinforcing plate (see arrows in FIG. 3). In other words, this relatively large central sensing region ideally oscillates uniformly in the axial direction. Under realistic conditions, however, the reinforcing plate 6 tends to respectively "flutter" or wobble, i.e. the reinforcing plate 6 can be easily tilted out of the diaphragm plane, particularly during fast position changes of the carburetor, and thereby lead to irregularities in the carburetor control during its operation. These position-dependent irregularities are also intensified by the mass of the reinforcing plate 6.

Another problem of known control diaphragms can be seen in that the rubber coating comes in contact with fuel or fuel vapors during the operation of the engine. This leads to swelling of the rubber layer. While the engine is at standstill, the rubber layer dries and its swelling decreases again. Both processes take place randomly, but also affect the response and control behavior of the control diaphragm. In addition, frequent swelling and drying leads to an increased formation of cracks in the rubber layer.

A control diaphragm of this type is also manufactured in a multi-stage process such that it is relatively common for residual tensions, e.g. of the processed textile and rubber materials, to persist in the control diaphragm to different degrees and in random distribution. These residual tensions uncontrollably affect the control behavior. In addition, a control diaphragm with rivet-fastened reinforcing element is susceptible to leaks and cracking.

In order to partially eliminate the above-described problems, DE3827555 proposes a one-piece control diaphragm of polytetrafluoroethylene (PTFE). Instead of the rivet-fastened reinforcing plate, this control diaphragm features a reinforcing part that is either directly formed on the control diaphragm or connected to the control diaphragm by means of welding or bonding. Due to the mass concentration caused by the respective reinforcing plate or reinforcing part, however, the "fluttering" problem and the problem of position-dependent irregularities are not solved with this control diaphragm. This solution has not been able to establish itself on the market.

Another control diaphragm is known from WO2014018723. This control diaphragm has a multilayer structure with a continuous layer and an interrupted layer. The continuous layer closes the control chamber in a sealing manner and reacts to the pressure changes in the control chamber. The overall flexibility of the multilayer control diaphragm is highly dependent on the shape of the interrupted layer, which is realized, for example, in the form of a flat coil spring. The control diaphragm features a reinforcing body in the central sensing region. The manufacture of this control diaphragm is also relatively elaborate. In addition, possible deposits between the two layers can lead to irregularities during the operation of the carburetor.

Measurements on a known control diaphragm consisting of rubber-coated fabric and a rivet-fastened reinforcing plate show a pressure/displacement characteristic (i.e. a deflection of the sensing region in dependence on the pressure difference in the control chamber), which significantly flattens starting at a vacuum of approximately 4 millibar (see FIG. 7(a)). In other words, the control sensitivity is significantly reduced at operational vacuums between 4 and 8 millibar.

SUMMARY OF THE INVENTION

A control diaphragm that solves the above-described problems is disclosed. Position-dependent irregularities during the operation of the carburetor should particularly be prevented. It should furthermore be possible to realize a largely linear deflection over the entire relevant vacuum range.

The control diaphragm for controlling a fuel feed in a diaphragm carburetor of an internal combustion engine comprises a central, substantially flat sensing region, a functional region extending concentrically around the sensing region and a peripheral fastening border for fastening the control diaphragm in the diaphragm carburetor. In the installed state, the control diaphragm closes a control chamber of the diaphragm carburetor in a sealing manner. The central sensing region of the control diaphragm is functionally connected to a controlling lever of the diaphragm carburetor, which is arranged in the control chamber and senses the axial deflection of the sensing region in dependence on an operational pressure change in the control chamber in order to thereby control the fuel feed. The control diaphragm consists of a thermally stable and fuel-resistant, non-elastomeric plastic film with uniform thickness, in which a plurality of concentric corrugations forming the functional region are arranged such that the axial deflection of the sensing region in dependence on the operational pressure change in the control chamber progresses in accordance with a predefined displacement/pressure characteristic.

Until now, it was commonly assumed that a reinforcing plate is absolutely imperative for control diaphragms because the controlling lever would otherwise press into the diaphragm and therefore only allow a slight deflection (see DE3827555). However, it was now determined that this is not the case. The inherently rigid plastic film already prevents the controlling lever from pressing into the central sensing region of the control diaphragm as it may be the case with known rubber diaphragms. A reinforcing plate is not provided and not required. Irregularities during the operation caused by position changes of the carburetor are prevented in that the entire diaphragm has a substantially uniform thickness and therefore no mass concentrations.

The functional region is the region of the control diaphragm that primarily defines the flexibility and elasticity of the control diaphragm. The flexibility and the ductility of the plastic film are influenced with a plurality of concentric deformations in the functional region such that the bending behavior (flattening of the corrugations) of the control diaphragm dominates in comparison with a material extension within the diaphragm. This even allows a substantially linear deflection in response to the operational pressure change in the control chamber or a substantially linear displacement/pressure characteristic, respectively. In known rubber-coated control diaphragms, the material extension within the diaphragm dominates such that the deflection growth significantly diminishes as the vacuum increases (non-linear displacement/pressure characteristic). An approximately linear displacement/pressure characteristic cannot be realized. However, simulations have shown that the response behavior of the control diaphragm can be almost arbitrarily adjusted between a non-linear displacement/pressure characteristic (dominance of the material extension) and a linear displacement/pressure characteristic (dominance of the bending behavior) by varying the number of corrugations and the corrugation geometry (wavelength, amplitude) in the radial direction.

In a few embodiments, four to ten concentric corrugations are arranged in the functional region. The concentric corrugations may be realized in the form of concentric circles or concentric polygons.

In a few embodiments, the concentric corrugations may in the functional region be respectively combined with radial deformations or radial reinforcing ribs that preferably extend over the innermost concentric corrugations only. In other words, the functional region may contain several radial reinforcing ribs that preferably start on the outer edge of the sensing region and extend radially outward in the functional region. The length and number of the reinforcing ribs can be varied depending on the desired reinforcement. The number may vary between 3 and 12 reinforcing ribs. Good results were achieved with 6 reinforcing ribs. The reinforcing ribs typically extend over the innermost concentric corrugations only, i.e. up to approximately the center of the functional region. The inner functional region is thereby reinforced relative to the other functional region. This reinforcement stabilizes the sensing region with respect to undesirable tilting. Reinforcement by means of a reinforcing plate or by means of an increased material thickness in the center of the diaphragm—as it is the case with known control diaphragms—is not required. The reinforcing ribs are formed in the plastic film analogous to the concentric corrugations. In this way, the reinforcement is achieved without increasing the mass.

The concentric corrugations are typically realized in a wavelike manner in the radial direction. The radially wavelike corrugations may have an amplitude (from wave crest to wave trough) between 0.2 and 1.0 millimeter and/or a wavelength between 1.0 and 2.5 millimeter. The wavelength and the amplitude are typically constant over the entire functional region. However, the wavelength may also increase toward the central sensing region and/or the amplitude may decrease toward the central sensing region in order to increase the flexibility of the control diaphragm toward the central sensing region. The flexibility can also be influenced with the thickness of the plastic film. In a few embodiments, the plastic film has a thickness between and 100 micrometer, preferably between 25 and 50 micrometer. However, the film thickness is at least approximately identical over the entire film.

The control diaphragm is fixed in a carburetor with its fastening border such that the sensing region and the functional region define an active exposed region of the control diaphragm, which can react to pressure changes in the control chamber. The central sensing region is typically realized flat and substantially lies in the plane of the fastening border.

In a few embodiments, the radius of the sensing region amounts to less than 20%, preferably less than 15%, of the inner radius of the fastening border (or the active region of the control diaphragm, respectively) and/or of the outer radius of the functional region. Referred to the radial direction, the functional region extends over at least 80% of the active region of the control diaphragm. The radius of the central sensing region may lie between 1 and 5 millimeter. The inner radius of the functional region may lie between 1 and 5 millimeter and the outer radius of the functional region may lie between 10 and 30 millimeter.

In a few embodiments, the plastic film consists of a non-elastomeric plastic with a thermal stability of at least 150°. The plastic preferably has a modulus of elasticity (DIN EN ISO 527) in excess of 800 N/mm$^2$, particularly in excess of 2500 N/mm$^2$. The plastic may be selected from the group comprising polybenzimidazole (PBI), polyimide (PI), thermoplastic polyimide (TPI), polyamideimide (PAI), polyethersulfone (PES), polyphenylene sulfon (PPSU), polyetherimide (PEI), polysulfone (PSU), polyetherketone (PEK), polyaryletherketone (PAEK), polyphenylene sulfide (PPS), perfluoroalkoxy polymer (PFA), ethylene tetrafluoroethylene (ETFE), polychlortrifluoroethylene (PCTFE), polyvinylidenefluoride (PVDF), polybuteneterephthalate (PBT) or polyetheretherketone (PEEK). It is preferred to choose a plastic that is chemically resistant, particularly a fuel-resistant plastic.

One significant advantage of the inventive control diaphragm can be seen in that it requires no separate or integral reinforcing plate. It is likewise not required to reinforce the sensing region by means of an increased material thickness analogous to a respective reinforcement or central reinforcing part that increases the mass—as proposed, for example, in DE3827555. The control diaphragm has no mass concentration in its center such that no position-dependent irregularities arise during its operation (e.g. in a diaphragm carburetor). Another significant advantage can be seen in the simple manufacture because the control diaphragm can be produced of film material by means of thermoforming. In contrast to complicated fabric-reinforced rubber diaphragms, a simple single-layer film can be used in this case.

The invention furthermore pertains to a diaphragm carburetor with an inventive control diaphragm and the utilization of the inventive control diaphragm in a diaphragm carburetor.

BRIEF DESCRIPTION OF THE FIGURES

Exemplary embodiments of the invention are described in greater detail below with reference to the drawings. In these drawings.

WAYS FOR IMPLEMENTING THE INVENTION

Figure 1:
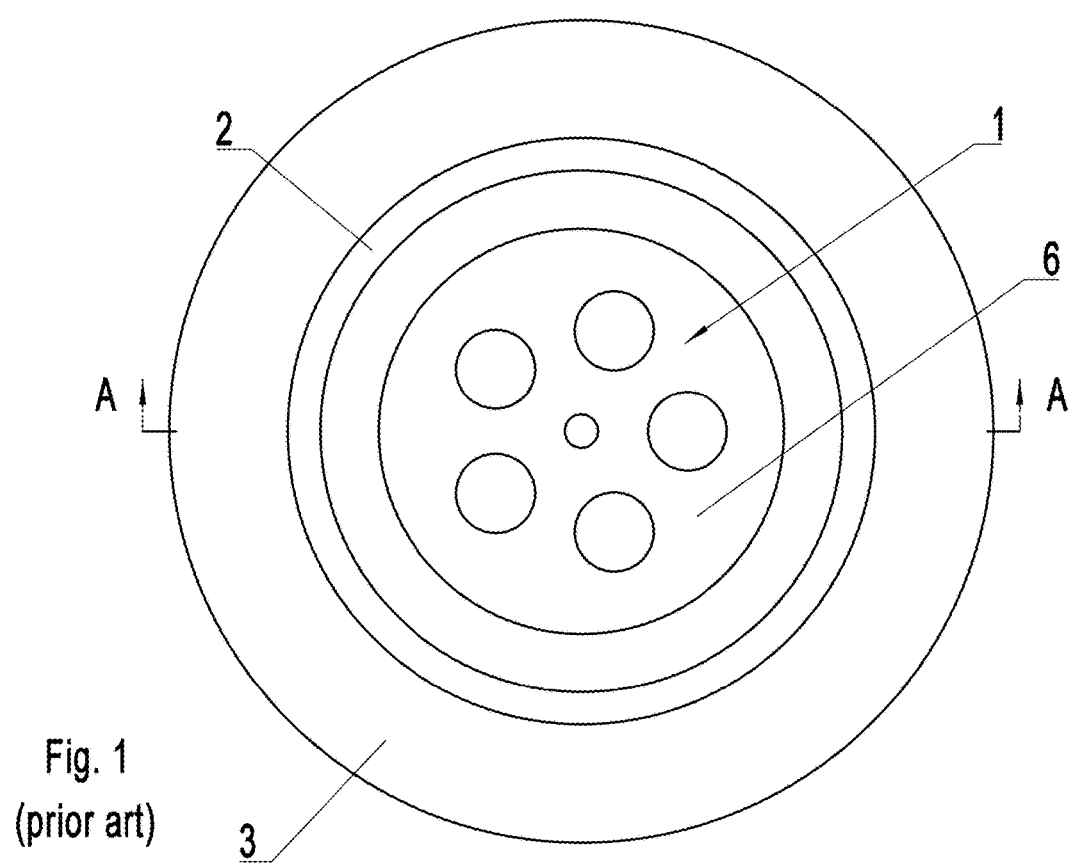
FIG. 1 shows a top view of a known control diaphragm with rivet-fastened reinforcing plate.
Figure 2:
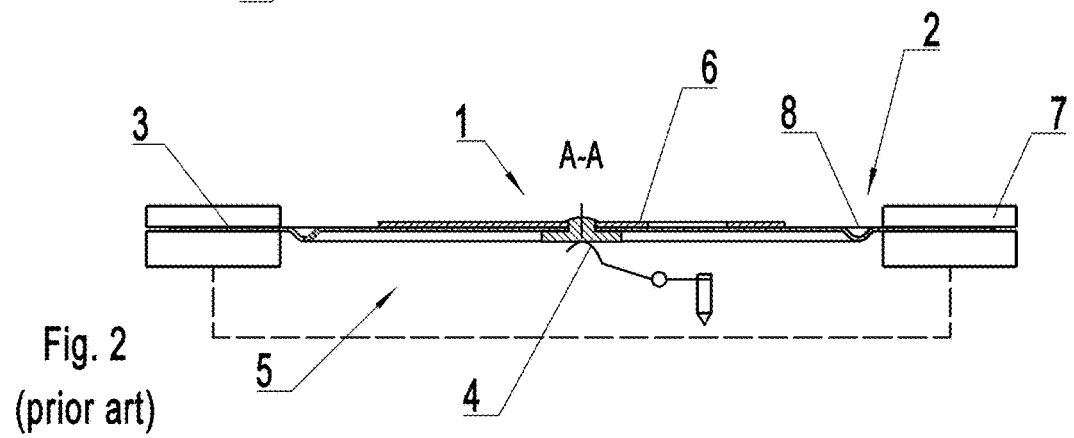
FIG. 2 shows a sectional representation of the control diaphragm according to FIG. 1 in the installed state.
Figure 3:
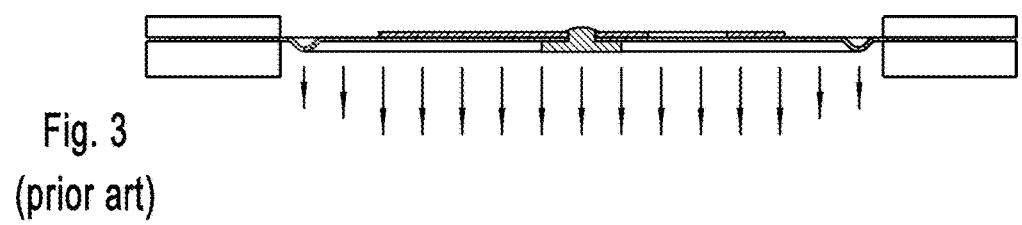
FIG. 3 shows a sectional representation of the control diaphragm according to FIG. 1, in which the deflection is schematically illustrated.

A control diaphragm known from the prior art is illustrated in FIGS. 1-3. FIG. 1 shows the control diaphragm in the form of a top view. FIG. 2 shows a sectional representation of the control diaphragm according to FIG. 1 in the installed state. A control chamber and a controlling lever are schematically illustrated.

The control diaphragm of a rubber-coated fabric centrally features a disk-shaped, rivet-fastened reinforcing plate 6 that forms a central sensing region 1 of the control diaphragm. Adjacent to this sensing region 1, the control diaphragm furthermore features a functional region 2 that is formed by a continuous peripheral corrugation 8 circumscribed by a fastening border 3. The control diaphragm is held in fastening means 7 of a diaphragm carburetor with the fastening border 3 and closes a control chamber 5 (broken lines) in a sealing manner. A controlling lever 4 is arranged in the control chamber 5 and can sense the diaphragm stroke of the control diaphragm in order to thereby control the fuel feed of the diaphragm carburetor. As already described above, the reinforcing plate 6 causes a uniform diaphragm stroke over the region covered by the reinforcing plate (see arrows in FIG. 3). The region covered by the reinforcing plate ideally oscillates uniformly in the axial direction. Under realistic conditions, however, the reinforcing plate 6 tends to respectively "flutter" or wobble, i.e. the reinforcing plate 6 can be easily tilted out of the diaphragm plane, particularly during fast position changes of the carburetor, and thereby lead to irregularities in the carburetor control during its operation.

Figure 7A:
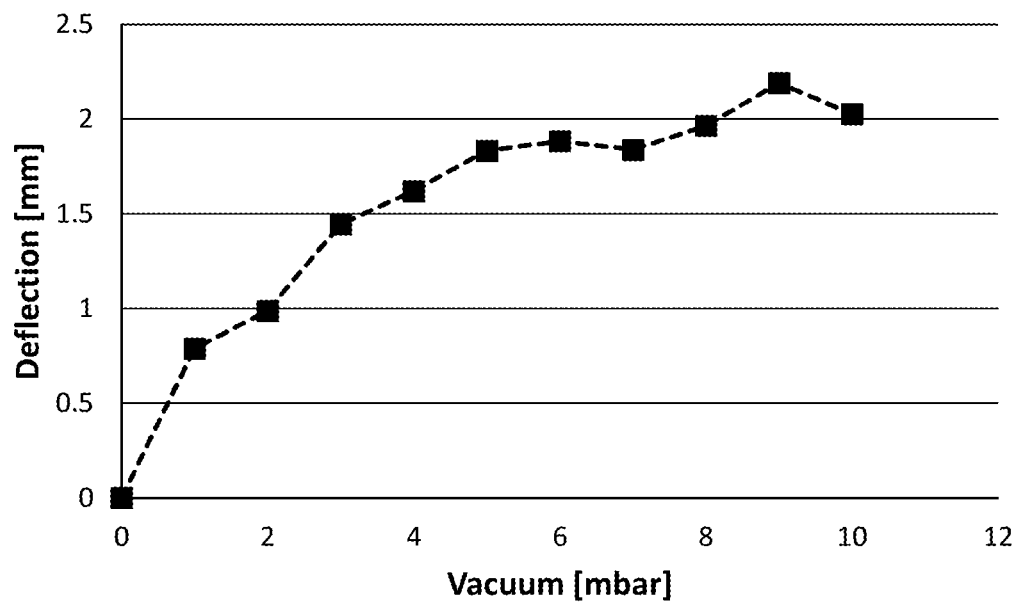
FIG. 7 shows displacement/pressure diagrams of a known control diaphragm (FIG. 7(a)) and of inventive control diaphragms (FIG. 7(b))

FIG. 7(a) shows a measurement of the displacement/pressure characteristic of the known diaphragm according to FIG. 1. This characteristic significantly flattens starting at a pressure change of approximately 4 millibar such that the control sensitivity is significantly reduced at a vacuum in excess of 4 millibar.

Figure 4:
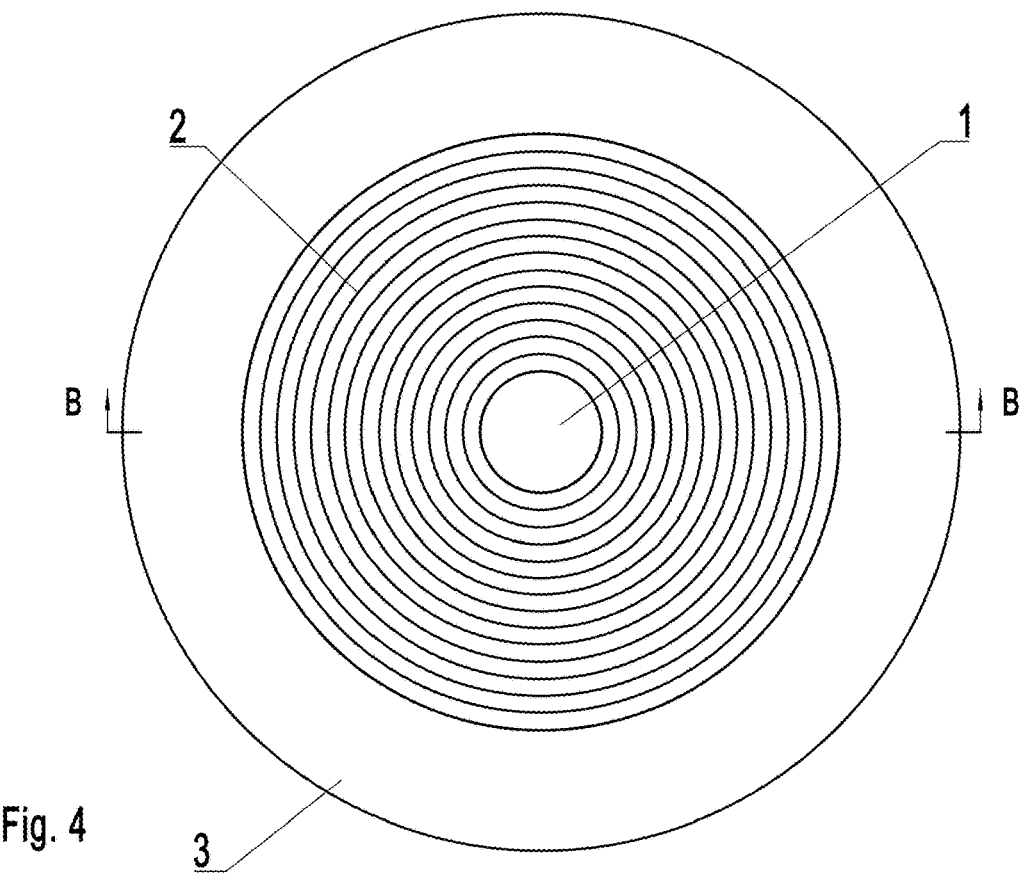
FIG. 4 shows a top view of an inventive control diaphragm.
Figure 5:
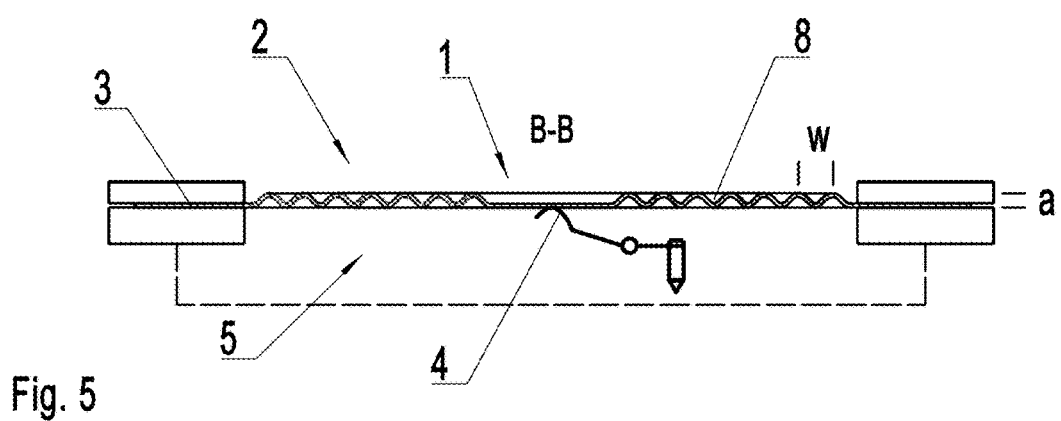
FIG. 5 shows a sectional representation of the control diaphragm according to FIG. 4 in the installed state.
Figure 6:
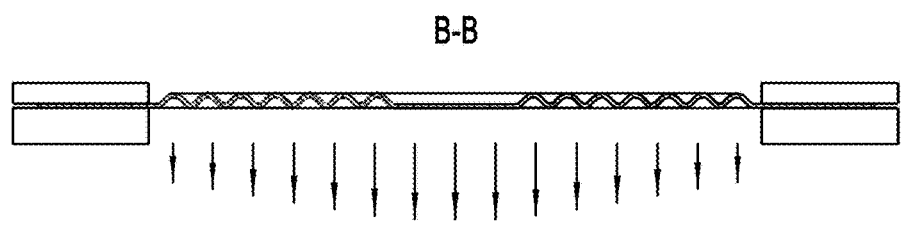
FIG. 6 shows a sectional representation of the control diaphragm according to FIG. 4, in which the deflection is schematically illustrated.

An embodiment of an inventive control diaphragm is illustrated in FIGS. 4-6. The control diaphragm consists of a plastic film with a thickness of approximately 20-100 micrometer. The plastic film consists of a plastic that has a thermal stability of at least 150° C. and is selected from the group comprising polybenzimidazole (PBI), polyimide (PI), thermoplastic polyimide (TPI), polyamideimide (PAI), polyethersulfone (PES), polyphenylene sulfon (PPSU), polyetherimide (PEI), polysulfone (PSU), polyetherketone (PEK), polyaryletherketone (PAEK), polyphenylene sulfide (PPS), perfluoroalkoxy polymer (PFA), ethylene tetrafluoroethylene (ETFE), polychlortrifluoroethylene (PCTFE), polyvinylidenefluoride (PVDF), polybuteneterephthalate (PBT) or polyetheretherketone (PEEK). Good results were achieved with a PEEK film with a thickness of 25 micrometer (see FIG. 7(b)).

The control diaphragm features a sensing region 1, a functional region 2 and a fastening border 3. The sensing region 1 and the functional region 2 define the active exposed region of the control diaphragm, which is deflected due to pressure changes in the control chamber 5. The control diaphragm is held in fastening means 7 of the carburetor in a sealing manner by means of the fastening border 3. A controlling lever 4 arranged in the control chamber 5 senses the deflection of the sensing region 1 of the control diaphragm and thereby controls the fuel feed in the carburetor.

In the embodiment shown, the sensing region 1 has a radius of less than 20% of the radius of the active region of the control diaphragm. The remainder of the active region is formed by the functional region 2.

In the embodiment shown, seven circular corrugations are concentrically formed in the plastic film in the functional region 2. Referred to the radial direction, the concentric corrugations are realized in a wavelike manner with constant wavelength w and amplitude a. The wavelike corrugations increase the flexibility and the ductility of the plastic film in the functional region 2. During the operation of the carburetor, the vacuum being generated in the control chamber causes a deflection of the control diaphragm, wherein the maximum diaphragm stroke occurs in the central sensing region 1. However, the flat sensing region 1 of the control diaphragm itself is only marginally curved due to the relatively inelastic plastic film.

The flexibility of the plastic film is influenced with the concentric corrugations such that the maximum deflection is focused in a controlled manner on the central sensing region, which is realized so small and without central weight concentration that wobbling motions—of the type occurring in known control diaphragms with rigid oscillating plates and mobility in the periphery only—cannot arise.

Simulations have shown that the rigidity of the control diaphragm increases with increasing amplitude and increasing thickness and decreases with increasing wavelength. Consequently, the response behavior of the control diaphragm can be almost arbitrarily adjusted between a non-linear displacement/pressure characteristic (dominance of the material extension) and a linear displacement/pressure characteristic (dominance of the bending behavior) by varying the number of corrugations and the corrugation geometry (wavelength, amplitude) in the radial direction.

Figure 7B:
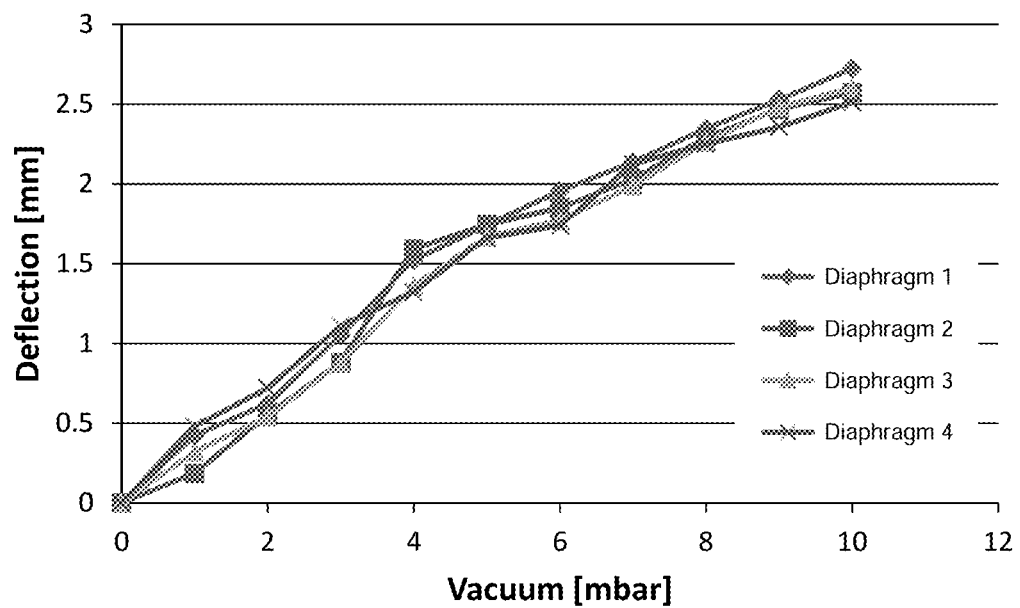

The number of corrugations, as well as their amplitudes a and wavelengths w, may be chosen such that the axial deflection of the sensing region 1 in dependence on the operational pressure change in the control chamber 5 substantially progresses linearly. An example of such a progression is illustrated in FIG. 7(b). FIG. 7(b) shows the measuring data of four control diaphragms that were manufactured of a PEEK film with a thickness of 25 micrometer. The functional region 2 respectively features seven circular corrugations 8 that are realized in a wavelike manner in the radial direction. The amplitude amounts to approximately 0.44 millimeter and the wavelength w amounts to approximately 1.6 millimeter. The sensing region 1 has a radius of approximately 3 millimeter. The outer radius of the functional region 2 amounts to approximately 12.5 millimeter.

Figure 8A:
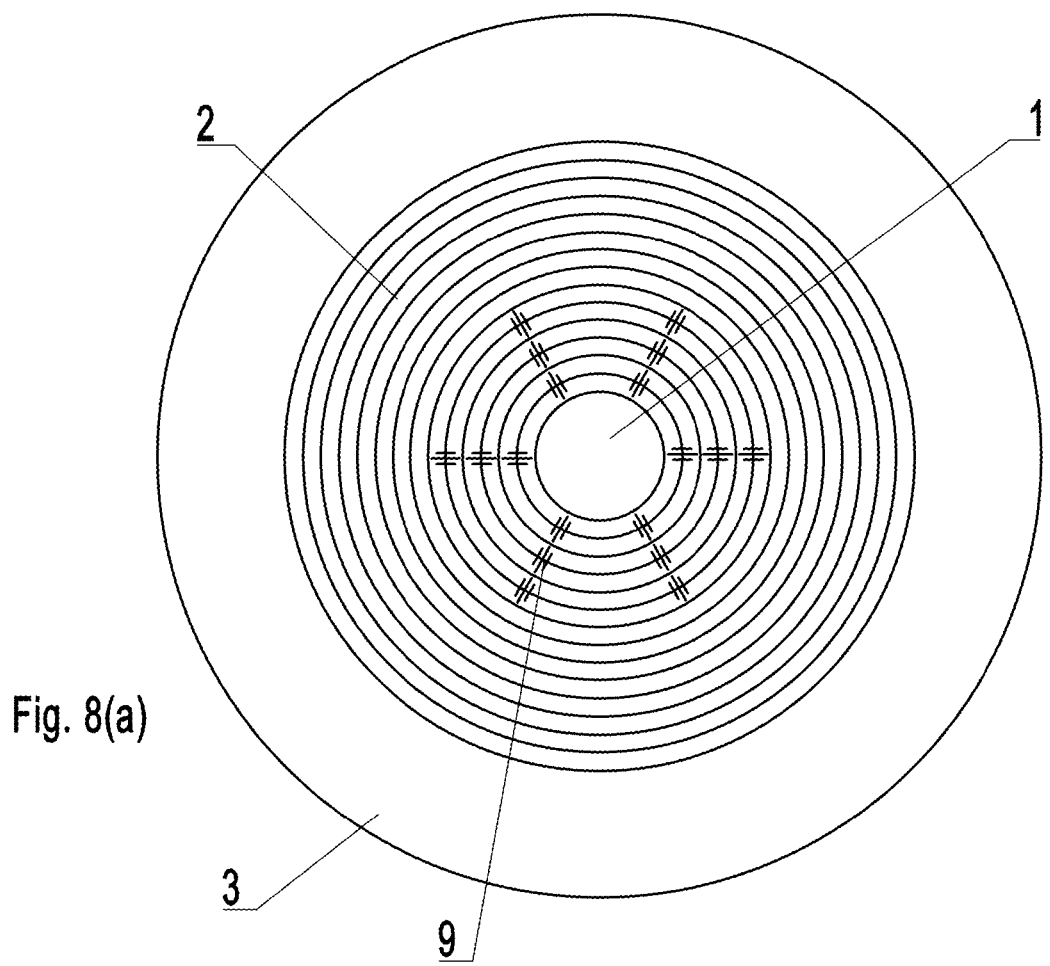
FIG. 8 shows a top view (FIG. 8(a)) and a perspective view (FIG. 8(b)) of an inventive control diaphragm with radial reinforcing ribs.
Figure 8B:
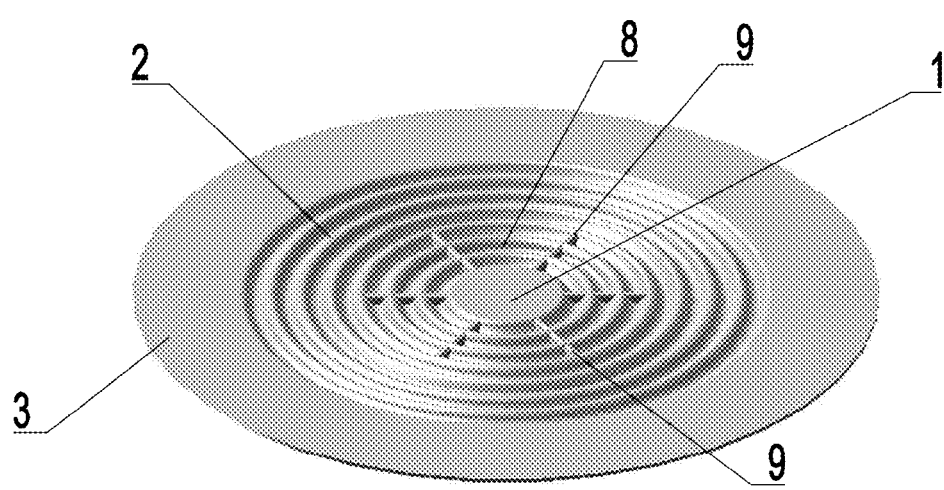

In contrast to the above-described control diaphragms, the control diaphragm according to FIG. 8(a) and FIG. 8(b) additionally features radial reinforcing ribs 9 that start on the outer edge of the sensing region 1 and extend radially outward over the first three concentric corrugations 8 of the functional region 2. The height of the reinforcing ribs 9 may vary, but typically lies in the plane of the sensing region 1. The reinforcing ribs are formed in the plastic film analogous to the concentric corrugations and lead to a local reinforcement of the diaphragm without increasing the mass. The degree of reinforcement can be influenced with the number, length, width and height of the reinforcing ribs. Viewed from the side shown, the reinforcing ribs are realized in the form of elevations in the wave troughs. Viewed from the other side, the reinforcing ribs are realized in the form of incisions in the wave crests.

LIST OF REFERENCE SYMBOLS

1 Sensing region
2 Functional region
3 Fastening border
4 Controlling lever
5 Control chamber
6 Reinforcing plate
7 Fastening means
8 Concentric corrugations
9 Radial reinforcing ribs

The invention claimed is:
1. A control diaphragm for controlling a fuel feed in a diaphragm carburetor of an internal combustion engine, the carburetor having a controlling lever, the control diaphragm comprising:
a central, substantially flat sensing region having a functional region extending concentrically around the sensing region and a peripheral fastening border for fastening the control diaphragm in the diaphragm carburetor;
the control diaphragm closing, in the installed state, a control chamber of the diaphragm carburetor in a sealing manner;
the central sensing region of the control diaphragm functionally connected to the controlling lever of the diaphragm carburetor, which is arranged in the control chamber and senses the axial deflection of the sensing region in dependence on an operational pressure change in the control chamber;
the control diaphragm consists of a thermally stable and fuel-resistant, non-elastomeric plastic film with uniform thickness, in which a plurality of concentric corrugations forming the functional region are arranged such that the axial deflection of the sensing region in dependence on the operational pressure change in the control chamber progresses in accordance with a predefined displacement/pressure characteristic, the diaphragm not including a separate reinforcing plate.

2. The control diaphragm according to claim 1, wherein four to ten concentric corrugations are formed in the functional region.
3. The control diaphragm according to claim 1, wherein the corrugations are realized in the form of concentric circles or concentric polygons.
4. The control diaphragm according to claim 1, wherein the concentric corrugations are realized in a wavelike manner in the radial direction.
5. The control diaphragm according to claim 4, wherein the radially wavelike corrugations have an amplitude from wave crest to wave trough between 0.2 and 1.0 millimeter and/or a wavelength between 1.0 and 2.5 millimeter.
6. The control diaphragm according to claim 4, wherein the radially wavelike corrugations have an amplitude and a wavelength and wherein the wavelength increases toward the central sensing region and/or the amplitude decreases toward the central sensing region.
7. The control diaphragm according to claim 1, wherein the radius of the sensing region amounts to less than 20% of the inner radius of the fastening border and/or the outer radius of the functional region.
8. The control diaphragm according to claim 1, wherein the radius of the sensing region lies between 1 and 5 millimeter and/or the inner radius of the functional region lies between 1 and 5 millimeter and the outer radius of the functional region lies between 10 and 20 millimeter.
9. The control diaphragm according to claim 1, wherein several radial reinforcing ribs are formed in the functional region.
10. The control diaphragm according to claim 1, wherein the thickness of the plastic film lies between 20 and 100 micrometer, and is at least approximately identical over the entire control diaphragm surface.
11. The control diaphragm according to claim 1, wherein the plastic film consists of a plastic with a thermal stability of at least 150°.
12. The control diaphragm according to claim 1, wherein the plastic is selected from the group comprising polybenzimidazole (PBI), polyimide (PI), thermoplastic polyimide (TPI), polyamideimide (PAI), polyethersulfone (PES), polyphenylene sulfon (PPSU), polyetherimide (PEI), polysulfone (PSU), polyetherketone (PEK), polyaryletherketone (PAEK), polyphenylene sulfide (PPS), perfluoroalkoxy polymer (PFA), ethylene tetrafluoroethylene (ETFE), polychlortrifluoroethylene (PCTFE), polyvinylidenefluoride (PVDF), polybuteneterephthalate (PBT) or polyetheretherketone (PEEK).
13. The control diaphragm according to claim 1, wherein the plastic has a modulus of elasticity according to DIN EN ISO 527 in excess of 800 N/mm2.
14. A diaphragm carburetor with a control diaphragm according to claim 1.
15. The utilization of a control diaphragm according to claim 1 as a control diaphragm in a diaphragm carburetor in an internal combustion engine powered device.
16. The control diaphragm of claim 1, wherein the plastic film has a modulus of elasticity according to DIN EN ISO 527 in excess of 2500 N/mm2.
17. The control diaphragm of claim 1, wherein deflection of the diaphragm is caused by bending at the plurality of concentric corrugations to thereby cause a substantially linear deflection of the diaphragm as vacuum is increased through an operable range of vacuum pressure.
18. The control diaphragm of claim 17, further including reinforcing ribs which intersect concentric corrugations.

19. The control diaphragm of claim 1, wherein the plastic film of the control diaphragm directly contacts the controlling lever.

20. The control diaphragm of claim 1, wherein the plurality of concentric corrugations are shaped to have at least one of relatively varying wavelength and relatively varying amplitude, thereby collectively causing a substantially linear deflection of the diaphragm as vacuum is increased through an operable range of vacuum pressure.

* * * * *